United States Patent
Sander

(10) Patent No.: US 8,303,235 B2
(45) Date of Patent: Nov. 6, 2012

(54) FLUSH-MOUNTED VEHICLE RESTRAINTS

(75) Inventor: Reinhard E. Sander, Wauwatosa, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 507 days.

(21) Appl. No.: 12/420,644

(22) Filed: Apr. 8, 2009

(65) Prior Publication Data

US 2010/0260585 A1    Oct. 14, 2010

(51) Int. Cl.
  *B65G 67/02*    (2006.01)
  *B65G 69/02*    (2006.01)
(52) U.S. Cl. ........................................... 414/401
(58) Field of Classification Search .................. 414/401; 198/750.14
  See application file for complete search history.

(56) References Cited

U.S. PATENT DOCUMENTS

| | | | | |
|---|---|---|---|---|
| 3,495,545 A | * | 2/1970 | Zeloko | 104/89 |
| 4,095,699 A | * | 6/1978 | O'Neil | 414/660 |
| 4,127,856 A | | 11/1978 | Bickel | |
| 4,524,863 A | * | 6/1985 | Moge | 198/797 |
| 4,674,941 A | * | 6/1987 | Hageman | 414/401 |
| 4,762,460 A | * | 8/1988 | Stoll | 414/250 |
| 4,865,507 A | | 9/1989 | Trickle | |
| 4,920,598 A | | 5/1990 | Hahn | |
| 5,203,663 A | * | 4/1993 | Ruppe | 414/401 |
| 5,505,575 A | * | 4/1996 | Alexander | 414/401 |
| 6,070,283 A | | 6/2000 | Hahn | |
| 6,311,352 B1 | | 11/2001 | Springer | |
| 6,488,464 B1 | * | 12/2002 | Kish | 414/401 |
| 6,539,876 B1 | * | 4/2003 | Campbell et al. | 104/130.01 |
| 6,880,301 B2 | | 4/2005 | Hahn et al. | |
| 7,134,159 B2 | | 11/2006 | Muhl et al. | |
| 7,213,285 B2 | | 5/2007 | Mitchell | |
| 7,363,670 B2 | | 4/2008 | Mitchell et al. | |
| 2002/0168255 A1 | | 11/2002 | Kish | |
| 2004/0042882 A1 | | 3/2004 | Breen | |
| 2004/0062628 A1 | | 4/2004 | Alexander et al. | |
| 2006/0045678 A1 | | 3/2006 | Andersen | |

OTHER PUBLICATIONS

Canadian Intellectual Property Office, "Office Action," issued in connection with Canadian application serial No. 2,698,923, issued Oct. 19, 2011, 4 pages.

* cited by examiner

*Primary Examiner* — James Keenan

(74) *Attorney, Agent, or Firm* — Hanley, Flight & Zimmerman, LLC

(57) ABSTRACT

A vehicle restraint installed within a pit underneath a dock leveler of a loading dock platform includes a single actuator that both extends and raises a barrier into engagement with a vehicle's ICC bar. When the barrier is in a retracted, stored position, the barrier is underneath the dock leveler and behind a front face of the loading dock platform. To engage the vehicle's ICC bar, the single actuator extends to first push the barrier along a first track to an intermediate position. That same actuator then pushes the barrier along a second track to a raised, operative position where the barrier engages and captures the vehicle's ICC bar. A spring coupled to the actuator provides the barrier with freedom to float along the second track to accommodate similar incidental movement of the ICC bar as the vehicle is serviced at the dock.

25 Claims, 3 Drawing Sheets

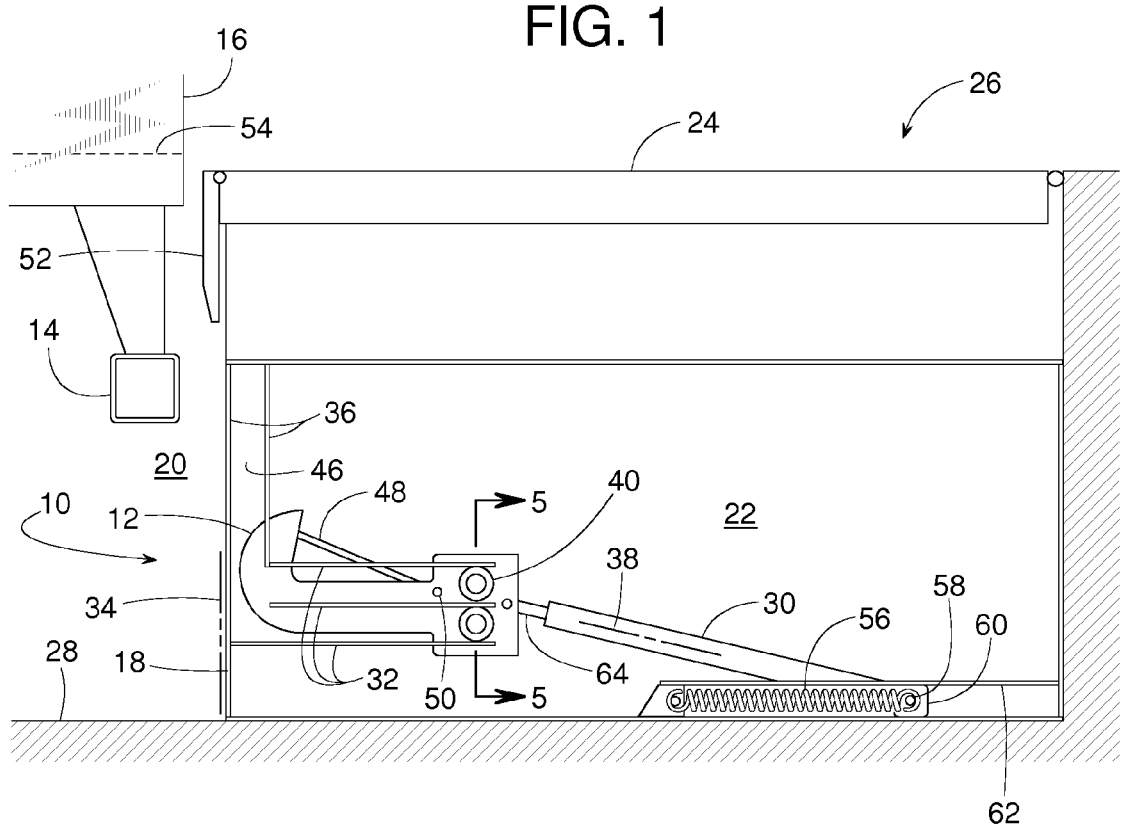
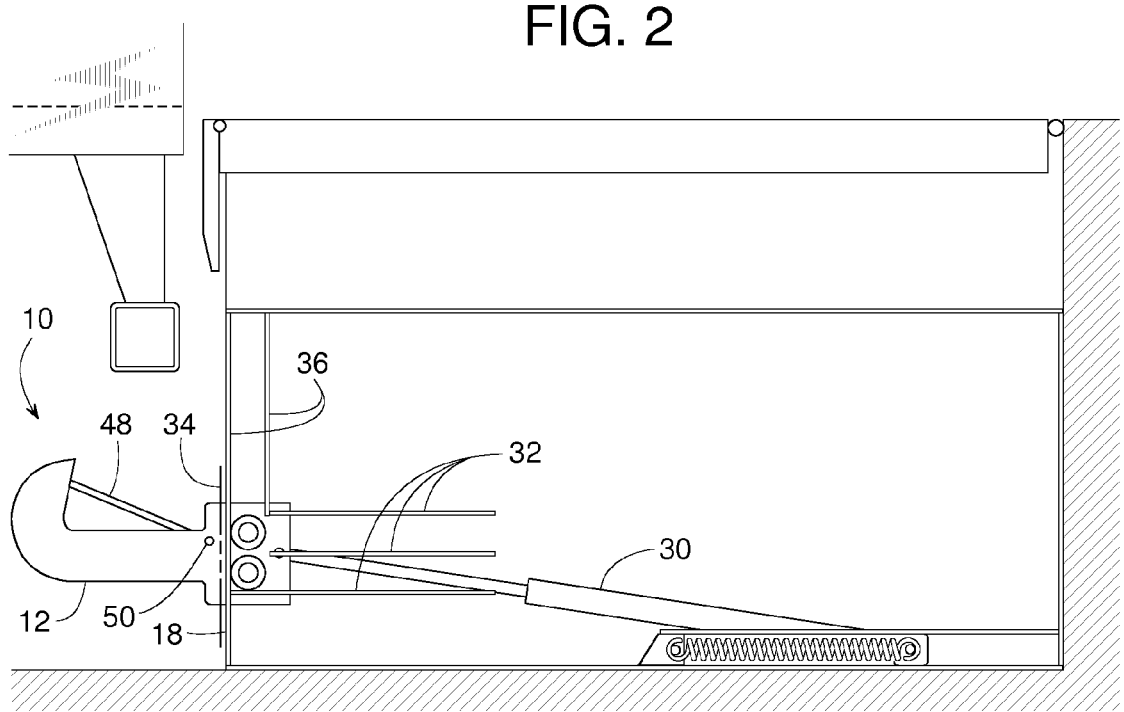

FLUSH-MOUNTED VEHICLE RESTRAINTS

FIELD OF THE DISCLOSURE

The subject disclosure generally pertains to vehicle restraints at a truck loading dock and, more specifically, to a flush-mounted vehicle restraints.

BACKGROUND

When loading or unloading a truck parked at a loading dock, it is generally a safe practice to help restrain the truck from accidentally moving too far away from the dock. This is typically accomplished by a hook-style vehicle restraint that engages what is often referred to in the industry as an ICC bar or a Rear Impact Guard (RIG) of a truck. An ICC bar or RIG is a bar or beam that extends horizontally across the rear of a truck, below the truck bed. Its primary purpose is to help prevent an automobile from under-riding the truck in a rear-end collision.

An ICC bar, however, also provides a convenient structure for a hook-style restraint to reach up in front of the bar to obstruct the bar's movement away from the dock. An example vehicle restraint may be stored behind the dock face, and extends and retracts hydraulically to firmly capture or release an ICC bar via a hook. Typically, hydraulic pressure is used to operate the restraint. However, hydraulic pressure substantially resists longitudinal movement of the hook. While there are benefits to restraints that store behind the dock face, using a hydraulic cylinder or other actuator to resist some, or all of to pullout forces of the vehicle is not ideal.

BRIEF DESCRIPTION OF THE DRAWINGS

FIG. 1 is a side view of an example vehicle restraint disclosed herein shown in a stored position underneath an elevated deck of a loading dock.

FIG. 2 is a side view of the example vehicle restraint of FIG. 1, but showing an example barrier of the restraint at an intermediate position.

DETAILED DESCRIPTION

Figure 3:
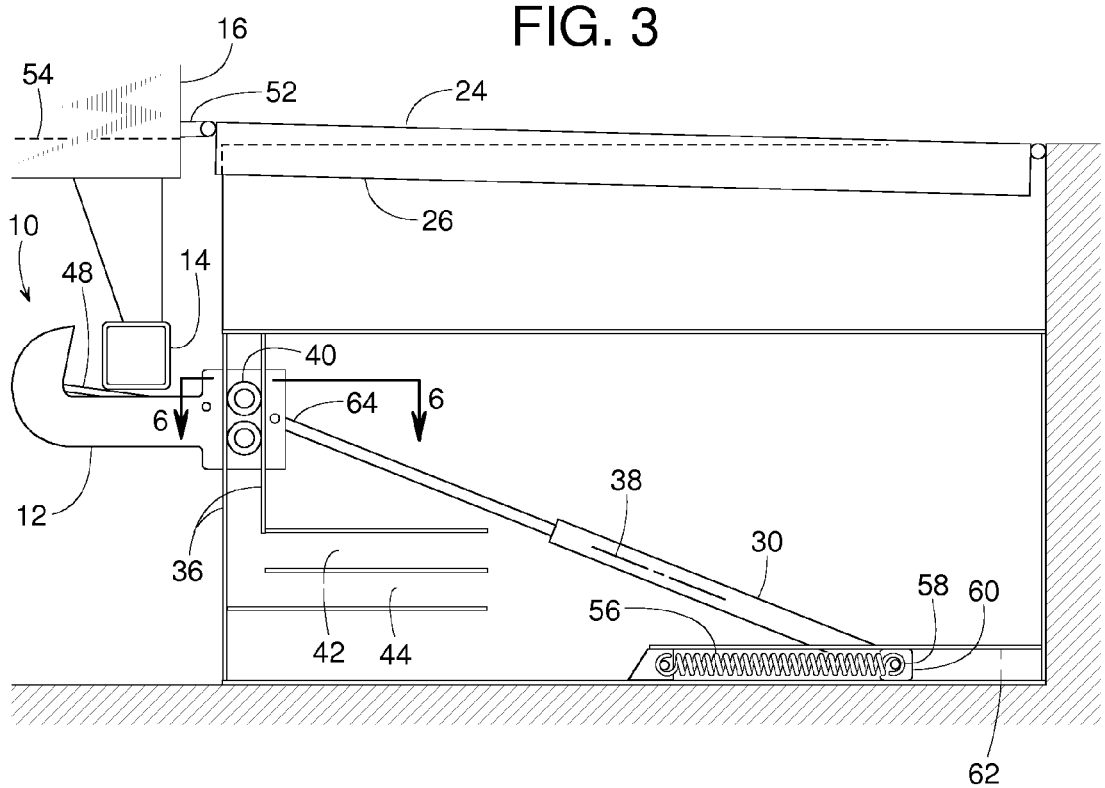
FIG. 3 is a side view of the example vehicle restraint of FIGS. 1-2, but showing the barrier at an operative position.

A vehicle restraint 10 includes a deployable barrier 12 for engaging an ICC bar 14 of a vehicle 16 to help restrain or prevent the vehicle 16, as it is being loaded or unloaded of its cargo, from inadvertently moving or pulling forward or away from a forward facing dock face 18 of a loading dock 20. Vehicle restraint 10 can be installed within a pit 22 underneath an elevated deck 24. Deck 24 can be the upper movable plate of a dock leveler 26, or deck 24 could be a stationary floor surface. Examples of dock levelers are described in U.S. Pat. Nos. 4,865,507; 4,920,598; 6,070,283; 6,311,352; 6,880,301; 7,134,159; 7,213,285; and 7,363,670; all of which are hereby specifically incorporated by reference herein. The example vehicle restraint 10 provides a restraint that can store behind the dock face, while providing enhanced features and benefits compared to existing similar restraints.

Barrier 12 is movable between a stored position (FIG. 1) and an operative position (FIG. 3). The movement can also be described as being between a retracted position behind dock face 18 (FIG. 1), and an extended position in which at least a part of the barrier 12 extends beyond the dock face 18 as shown in FIG. 2. For the second phase of the movement, the position of FIG. 2 can be considered a lowered or intermediate/extended position, and that of FIG. 3 a raised or operative position where the barrier 12 engages the vehicle 16 (e.g., the ICC bar 14). In the stored position of FIG. 1, barrier 12 is primarily underneath deck 24, which provides loading dock 20 with a neat, clean appearance and avoids creating an obstacle to nearby personnel and low-slung vehicles. For example, the retracted, stored position facilitates sweeping and snow removal of a driveway 28 that is adjacent to dock face 18. In the operative position of FIG. 3, barrier 12 extends out from underneath deck 24 to engage bar 14 of vehicle 16.

To move barrier 12 from its stored position to its operative position, an actuator 30 (e.g., a hydraulic cylinder, a pneumatic cylinder, a rodless cylinder, an electric linear motor, a hydraulic linear motor, etc.) pushes or moves barrier 12 first along a lower track 32 from the stored/retracted position of FIG. 1 to the intermediate/extended position of FIG. 2. Upon doing so, barrier 12 passes through an imaginary vertical plane 34 defined by dock face 18. From the intermediate position of FIG. 2, actuator 30 then pushes barrier 12 up along an upper track 36 to the raised/operative position of FIG. 3. A single actuator can be used to move or push barrier 12 along track 32 and particularly along track 36 because actuator 30 has a longitudinal centerline 38 that lies at an incline. (As used herein the term, "incline" means that the centerline of the referenced object is neither horizontal nor vertical). It should be noted that the lower and upper tracks 32 and 36 are herein depicted as being generally horizontal and vertical, respectively. The angular orientation of each need not be so limited, however, and could differ from being perfectly horizontal or vertical, either because of tolerancing, or for operational or manufacturing reasons, and we have thus characterized these orientations as "substantially" horizontal and vertical. The distinction between the tracks 32 and 36 lies in how they are oriented to achieve their primary functions. For example, as shown herein, the lower track 32 guides the barrier 12 between the retracted position (FIG. 1) and the extended position (FIG. 2) relative to the dock face 18, and the upper track 36 guides the barrier 12 between a lowered position and the raised/engaged position (FIG. 3).

To facilitate movement of the barrier 12 along the tracks 32 or 36 and to react to pull-out forces as described below, the illustrated example includes track followers in the form of rollers 40 for guiding the translation of barrier 12 along tracks 32 and 36. While the illustrated example employs rollers for both guiding the barrier and reacting the pull-out forces, such functionality does not need to be combined in one structure. On the contrary, rollers may be used for guiding and some other structure (e.g., a brace or a bracket, etc.) engaging the track may be used for pull-out.

Figure 5:
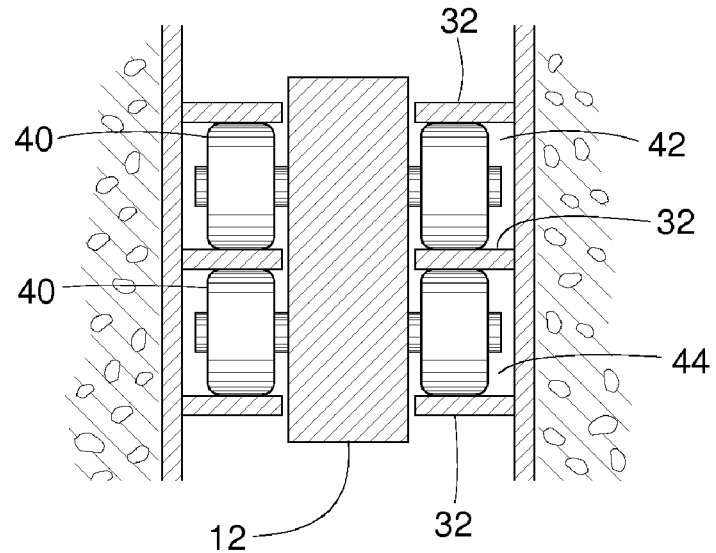
FIG. 5 is a view taken along line 5-5 of FIG. 1.
Figure 6:
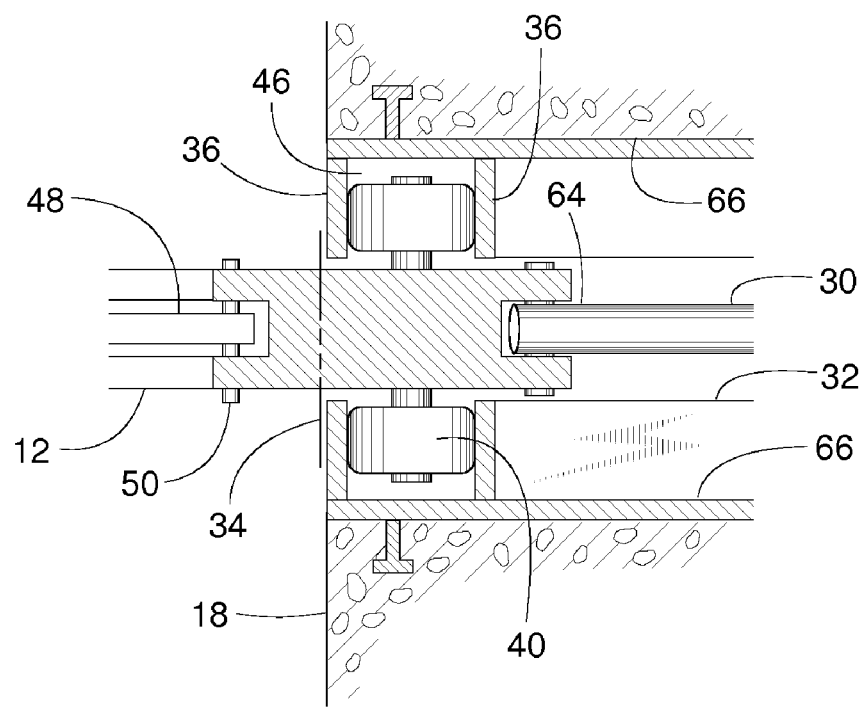
FIG. 6 is a view taken along line 6-6 of FIG. 3.

In the illustrated example, the barrier 12 includes two pairs of rollers 40 (FIGS. 5 and 6). Lower track 32 comprises two track paths 42 and 44, and upper track 36 has a single track path 46. However, other roller and track arrangements can be used to implement the example vehicle restraint 10 described herein.

A switch lever 48 can be pivotally connected at a point 50 on barrier 12 to signal when barrier 12 engages bar 14 of vehicle 16. Such a signal can be used to deactivate actuator 30 and to control stop/go signal lights for the driver of vehicle 16 and other workers at dock 20. The triggering or activation of switch lever 48 can also be used for allowing or disabling operation of dock leveler 26.

In typical operation, vehicle 16 backs into dock 20 while vehicle restraint 10 is in its stored position, as shown in FIG. 1. Once vehicle 16 is properly positioned adjacent to dock face 18, actuator 30 extends to push barrier 12 to the intermediate position of FIG. 2 and then to the operative position of FIG. 3. Upon reaching the operative position of FIG. 3, barrier 12 engages vehicle 16 (e.g., the ICC bar 14) to restrain vehicle 16 so dock leveler 26 can be manipulated to rest its extension lip 52 on the vehicle's trailer bed 54, which provides a bridge between deck 24 and bed 54.

Figure 4:
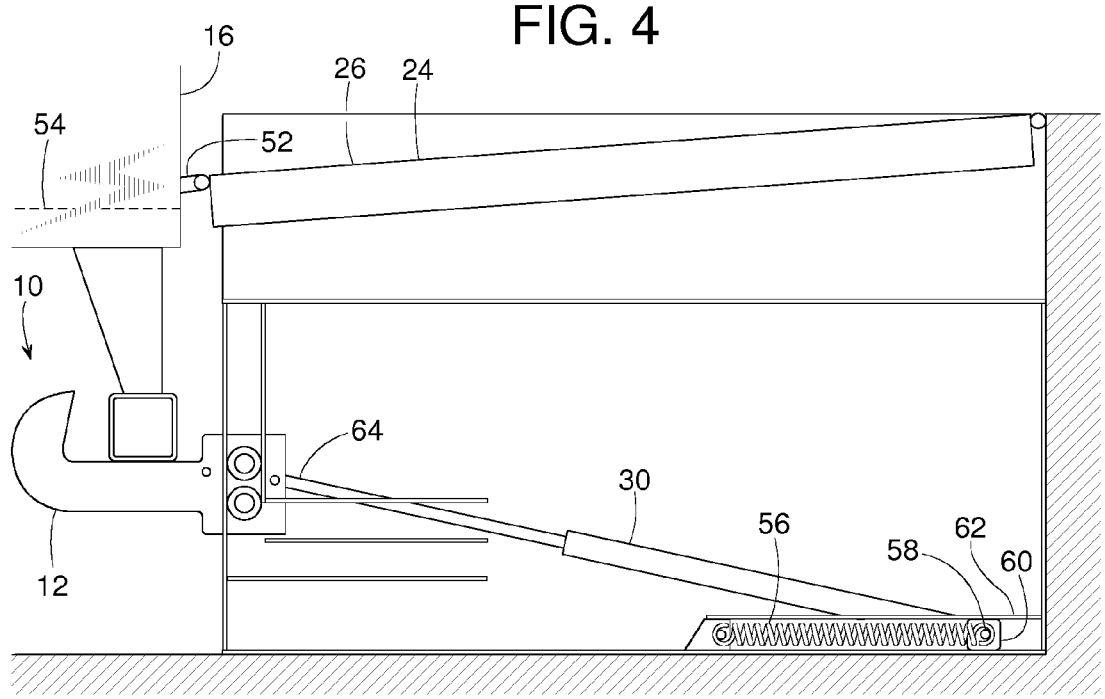
FIG. 4 is a side view of the example vehicle restraint of FIG. 3, but showing the barrier at another operative position.

If the weight of a forklift or added cargo forces trailer bed 54 downward or the vehicle's driver lowers bed 54, as shown in FIG. 4, one or more biasing elements or tension springs 56 allow an end 58 (e.g., a lower end) of actuator 30 and a slide block 60 to which end 58 is connected to slide along a guide track 62, thereby allowing an end 64 (e.g., an upper end) of actuator 30 and barrier 12 to descend resiliently in response to the descent of trailer bed 54 and bar 14. Thus, barrier 12 is movable or slidable along track 36 to a range of resilient operative positions by virtue of the resilience of spring 56, thereby providing vehicle 16 and barrier 12 freedom to float (e.g., vertically) within track 36 without the need for extending or retracting cylinder 30. As used herein, the term, "spring," broadly encompasses any device that can store energy for providing a resilient or restorative force.

If vehicle 16 attempts to pull away from dock face 18 while still restrained by barrier 12, the vehicle's pull-out force applied to barrier 12 is transmitted to rollers 40 and upper track 36. Since upper track 36 is firmly anchored to, for example, a concrete sidewall 66 (FIG. 6) of pit 22, actuator 30 does not need to be sized to resist the pull-out force.

After the loading or unloading of vehicle 16 is complete, dock lever 26 can return to its stored configuration shown in FIGS. 1 and 2. As actuator 30 retracts, barrier 12 descends first to the intermediate position of FIG. 2 and then to the stored position of FIG. 1. The weight of barrier 12 can be the force that lowers barrier 12 from its operative position of FIG. 3 to its intermediate position of FIG. 2, while actuator 30 controls the barrier's rate of descent. After barrier 12 descends to the intermediate position of FIG. 3, actuator 30 continues to retract to forcibly pull barrier 12 back to its stored position of FIG. 1.

At least some of the aforementioned examples include one or more features and/or benefits including, but not limited to, the following:

In some examples, a vehicle restraint installed within a pit underneath a dock leveler includes a single actuator that both extends and lifts a barrier into engagement with a vehicle.

In some examples, the pit mounted vehicle restraint includes a spring that provides the barrier with resilient vertical float to accommodate incidental vertical movement of the vehicle as cargo is being loaded or unloaded.

In some examples, the barrier transmits a vehicle pull-out force to a set of rollers and an upper track anchored to the sidewalls of the pit rather than transmitting the force to the barrier's actuator.

In some examples, the barrier includes rollers that shift from traveling along a lower track to an upper track.

Although certain example methods, apparatus, and articles of manufacture have been described herein, the scope of the coverage of this patent is not limited thereto. On the contrary, this patent covers all methods, apparatus, and articles of manufacture fairly falling within the scope of the appended claims either literally or under the doctrine of equivalents.

The invention claimed is:

1. A vehicle restraint for restraining a vehicle at a loading dock that includes an elevated deck and a forward facing dock face that faces a back end of the vehicle, the vehicle restraint comprising:
   a lower track;
   an upper track having a connection with the lower track; and
   a barrier engagable with the lower track and the upper track so as to be sequentially guided thereby;
   the lower track to guide the barrier between a retracted position behind the dock face and an extended position wherein at least a portion of the barrier extends forward from the dock face; and
   the upper track to receive the barrier via the connection and guide the barrier between a lowered position and a raised position where the barrier engages the vehicle.

2. The vehicle restraint of claim 1, wherein the lower track is substantially horizontal.

3. The vehicle restraint of claim 1, wherein the upper track is substantially vertical.

4. The vehicle restraint of claim 1, wherein the barrier includes a plurality of track followers that engage the upper track and lower track but not necessarily simultaneously.

5. The vehicle restraint of claim 4, wherein the track followers are rollers.

6. The vehicle restraint of claim 4, wherein forces applied by a vehicle moving forward against the barrier are reacted by engagement of the track followers with the upper track.

7. The vehicle restraint of claim 1, wherein the forward facing dock face lies generally along an imaginary plane through which the barrier passes upon moving from the retracted position to the extended position.

8. A vehicle restraint for restraining a vehicle at a loading dock that includes an elevated deck and a forward facing dock face that faces a back end of the vehicle, the vehicle restraint comprising:
   a lower track;
   an upper track;
   a barrier engagable with the lower track and the upper track so as to be sequentially guided thereby;
   the lower track being disposed to guide the barrier between a retracted position behind the dock face and an extended position wherein at least a portion of the barrier extends forward from the dock face;
   the upper track being disposed to guide the barrier between a lowered position and a raised position where the barrier engages the vehicle; and
   an actuator having a longitudinal centerline along which the actuator selectively extends and retracts, the actuator is coupled to the barrier such that when the actuator extends the actuator moves the barrier forward toward the extended position and then upward to the raised position, and when the actuator retracts the barrier moves downward and then backward toward the retracted position.

9. The vehicle restraint of claim 8, wherein the longitudinal centerline is at an incline that is neither horizontal nor vertical when the barrier is at the retracted position.

10. The vehicle restraint of claim 8, wherein the actuator is a hydraulic cylinder.

11. The vehicle restraint of claim 8, further comprising a spring coupled to the actuator to urge the barrier upward against the vehicle, wherein the barrier is movable to a range of resilient operative positions by virtue of the resilience of the spring, thereby providing the vehicle and the barrier freedom to float along the upper track.

12. A vehicle restraint for restraining a vehicle at a loading dock that includes an elevated deck and a forward facing dock face that faces a back end of the vehicle, the vehicle restraint comprising:

a barrier being movable between an operative position blocking the vehicle and a stored position releasing the vehicle; and an actuator coupled to the barrier and having a longitudinal centerline along which the actuator selectively extends and retracts, the actuator extends along a first portion of a full stroke length of the actuator to move the barrier forward to an extended position and the actuator extends along a second portion of the full stroke length of the actuator to move the barrier upward to the operative position, and wherein the actuator retracts along the second portion of the full stroke length to move the barrier downward and the actuator retracts along the first portion of the full stroke length to move the barrier backward to the stored position, the barrier's movement forward and backward is substantially linear, and the barrier's movement upward and downward is substantially linear.

13. The vehicle restraint of claim 12, wherein the actuator is disposed underneath the elevated deck.

14. The vehicle restraint of claim 12, wherein the forward facing dock face lies generally along an imaginary plane through which the barrier passes upon moving from the stored position to the extended position.

15. The vehicle restraint of claim 12, further comprising an upper track that guides the barrier's movement as the barrier moves upward toward the operative position.

16. The vehicle restraint of claim 12, further comprising a lower track that guides the barrier's movement as the barrier moves forward toward the operative position.

17. The vehicle restraint of claim 12, wherein the barrier upon moving from the stored position to the operative position moves forward and upward in a sequential manner.

18. The vehicle restraint of claim 12, wherein the longitudinal centerline is at an incline that is neither horizontal nor vertical when the barrier is at the stored position and the operative position.

19. The vehicle restraint of claim 12, further comprising a spring coupled to the actuator to urge the barrier upward against the vehicle, wherein the barrier is vertically movable to a range of resilient operative positions by virtue of the resilience of the spring, thereby providing the vehicle and the barrier freedom to float substantially vertically.

20. The vehicle restraint of claim 12, wherein the actuator is a hydraulic cylinder.

21. A method of restraining a vehicle at a loading dock that includes an elevated deck and a forward facing dock face that faces a back end of the vehicle, the method comprising:

storing a barrier such that the barrier is primarily underneath the elevated deck;

extending a single actuator along a first portion of a stroke length to move the barrier forward in translation such that the barrier protrudes out from beneath the elevated deck; and extending the single actuator along a second portion of the stroke length to raise the barrier into engagement with the vehicle, wherein the first portion and the second portion of the stroke lengths are less than a full stroke length of the actuator.

22. The method of claim 21, wherein moving the barrier forward and raising the barrier are performed generally sequentially.

23. The method of claim 21, wherein the single actuator is a hydraulic cylinder.

24. The method of claim 21, wherein the single actuator is disposed underneath the elevated deck.

25. A vehicle restraint for restraining a vehicle at a loading dock that includes an elevated deck and a forward facing dock face that faces a back end of the vehicle, the vehicle restraint comprising:

a lower track;

an upper track; and a barrier engagable with the lower track and the upper track so as to be sequentially guided thereby;

the lower track being disposed to guide the barrier between a retracted position behind the dock face and an extended position wherein at least a portion of the barrier extends forward from the dock face; and the upper track being disposed to guide the barrier between a lowered position and a raised position where the barrier engages the vehicle, wherein a centerline of an actuator operatively coupled to the barrier is at a non-parallel orientation relative to a longitudinal axis of the lower track and a longitudinal axis of the upper track when the barrier is in the raised position and when the barrier is in the stored position.

* * * * *